July 28, 1936.  J. H. STACKHOUSE  2,049,089
IRON HEATING UNIT
Filed Aug. 13, 1934
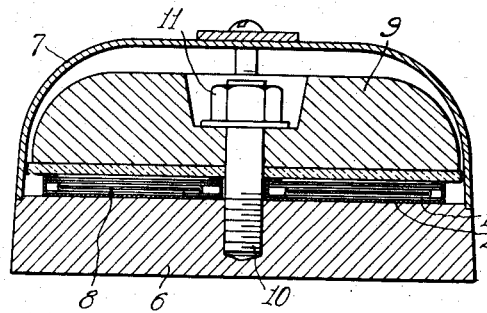
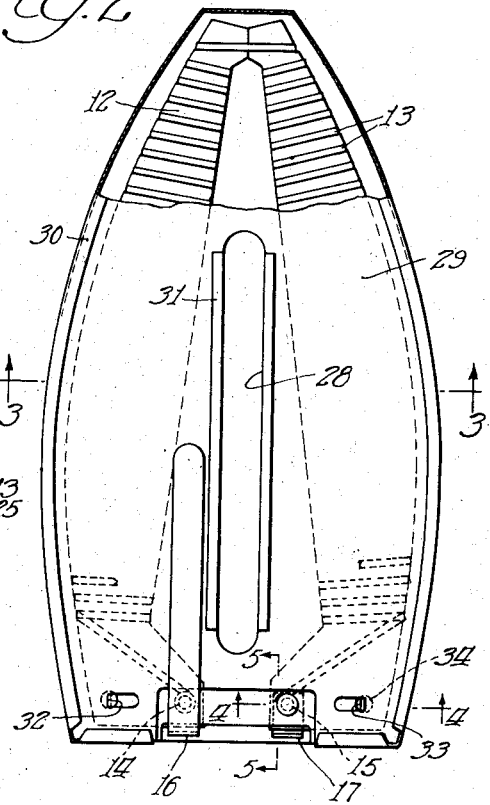
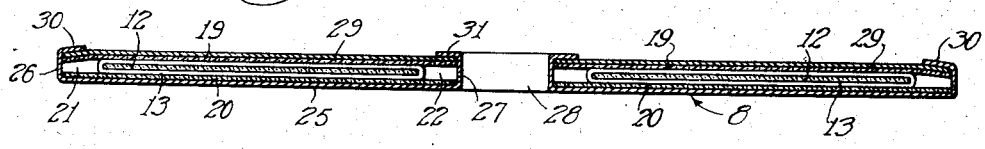
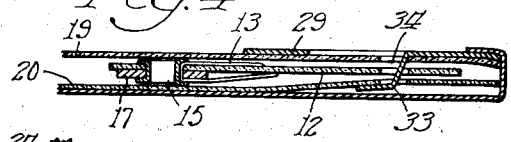
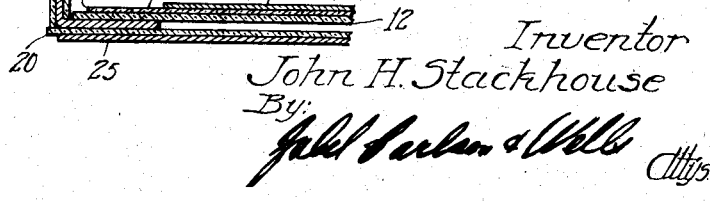
Inventor
John H. Stackhouse
By:

Patented July 28, 1936

2,049,089

UNITED STATES PATENT OFFICE 2,049,089

IRON HEATING UNIT

John H. Stackhouse, Chicago, Ill., assignor to Sheridan Electro-Units Corporation, a corporation of Illinois Application August 13, 1934, Serial No. 739,585

3 Claims. (Cl. 219—25)

My invention relates to electric irons and more particularly to a heating element structure for replacing the standard heat elements in electric irons or for original use as the heating element of the iron.

My invention contemplates the provision in a device of this character of a heating unit which may be readily inserted in the iron and which may be inserted with no danger of damage to the heating element itself.

The standard heating units generally used in electric irons are thin and flat. It is a purpose of my invention to provide a replacement unit which is protected from damage but which is so constructed as not to have any appreciable increase in thickness over the standard heating unit. To this end, my invention contemplates enclosing the heating element by means of thin insulating sheets and a sheath of very thin sheet metal.

Furthermore, my invention contemplates the provision of a replacement unit having full protection during the handling and installation thereof and yet having a highly efficient heat transferring structure whereby the heat from the heating element is transferred to the base of the iron.

Other features of importance in my invention are the simplicity of structure, the protection of all possible points for short circuit and the protection of the heating wire from oxidation.

I will describe the preferred form of my invention by reference to the accompanying drawing wherein—

Fig. 1 is a sectional view illustrating my invention as applied to a standard iron;

Fig. 2 is a plan view illustrating a heating unit constructed in accordance with my invention;

Fig. 3 is a sectional view taken on the line 3—3 of Fig. 2;

Fig. 4 is a sectional view taken on the line 4—4 of Fig. 2; and

Fig. 5 is a sectional view taken on the line 5—5 of Fig. 2.

Referring now in detail to the drawing, I show in Fig. 1 an ordinary flat iron of the electrically heated type having a base 6 and a cover 7, a heating unit 8 and a top plate 9. The heating element is clamped down against the base 6 by means of the bolt 10 and nut 11 which forces the top plate 9 down in position. The handle for the iron and the attaching means therefor have not been shown since they form no part of the present invention.

The parts 6, 7, 9 and 10 are of standard structure but the heating unit 8 embodies the features which produce the results above set forth. This heating unit is made up of a core 12 which consists of two elongated pieces of pressed mica plate. About these pieces is wound the heating element 13 which may be of any suitable high grade wire used for this purpose and this heating element has its opposite ends connected to the rivets 14 and 15 which in turn are connected to the terminals 16 and 17 to establish the electrical connections to the heating element.

The heating element is protected on its upper and lower surfaces by the insulating sheets 19 and 20 which preferably are of pure mica and which as shown clearly in Fig. 3, extend somewhat beyond the edges of the heating element as indicated at 21 and 22. The top mica sheet 19 at the back end where the terminals are connected is cut back as indicated at 23 (see Fig. 5) and the bottom mica sheet 20 projects out beyond the upturned portions of the terminals 16 and 17 so as to serve as a protection at this point against short circuit being made between the terminals and the iron body.

The terminals when being installed in the iron are suitably protected as for example by applying an insulating sleeve 24 thereo. This sleeve may be of asbestos or similar material.

The core 12, wire 13 and sheets 19 and 20 all are placed upon the protecting plate 25 which is provided with upstanding side flanges such as 26 and 27, the center of this plate being slotted as indicated at 28 to accommodate for the bolt 10. The plate 25 thus protects the side edges of the sheets 19 and 20 and also makes a protecting sheath for the lower surface of sheet 20. At the back end of the unit where the terminals 16 and 17 project upwardly the flange 26 is cut away but the edge of the plate 25 extends out almost as far as the mica sheet 20 as shown in Fig. 5.

A top plate 29 is fitted snugly down between the flanges 26 and 27 over the top of sheet 19 and then the flanges are bent over and crimped down as indicated at 30 and 31 in Fig. 3 to grip the side edges of sheets 19 and 20 between the plates 25 and 29. Plate 29 has a pair of tongues such as 32 and 33 which are struck out of the material thereon and which pass down through suitable openings indicated at 34 in Fig. 4 as provided in the sheets 19 and 20 and the core 12 so as to fix the position of these elements in the manner shown. Except for this fastening, plates 19 and 20 are not in any way secured to each other or to the heating element. The crimping of the flanges over on to the plate 29 however, serves to bend down the side edges of this plate and to a certain degree, the side edges of the mica sheets so that the heating element is firmly held in position within the sheets 19 and 20, these sheets being cut to exactly fit the flanges 26 and 27 having no opportunity to shift around.

The heating unit as assembled above is ready to be placed in the iron in the manner shown in Fig. 1. The coverings 25 and 29 are preferably made of a material having a greater heat conductivity than that of the iron base. In fact we prefer to make them also of a material through which the heat spreads evenly so that when the heating unit is pressed down against the base, the heat from the heating element will be evenly distributed to the iron base over the entire bottom surface of the plate 25. The high heat conductivity of copper is well known and I prefer to employ this material because of this characteristic and because of its ability to evenly spread the heat.

The success of this unit as a replacement for original heating units that have burned out depends somewhat upon its thickness. If it is too thick, then the cover of the iron cannot be fitted properly. I, therefore, use a very thin material for the sheets 25 and 29. This also facilitates heat transfer to the base of the iron. The thickness of sheets 25 and 29 should not exceed five thousandths of an inch per sheet.

From the above description, it is believed that the construction and advantages of this device will be clear to those skilled in this art.

Having thus described one specific form of my invention, what I claim as new and desire to secure by Letters Patent is:

1. A replacement unit for electric irons comprising a flat core, a resistance element thereon, protective sheets of insulating material on opposite sides of the core and having their side edges projecting beyond the core, and a soft metallic cover for said sheets composed of upper and lower plates overlapped and pressed together at their side edges one of said plates having positioning lugs passing through said sheets, said positioning lugs having their free ends bent over between the other of said plates and the adjacent sheet.

2. A replacement unit for electric irons comprising a flat core, a resistance element thereon, protective sheets of insulating material on opposite sides of the core and having their side edges projecting beyond the core, and a soft metallic cover for said sheets composed of upper and lower copper plates overlapped and pressed together at their side edges, one of said plates having positioning lugs passing through said sheets, said positioning lugs having their free ends bent over between the other of said plates and the adjacent sheet.

3. A replacement unit for electric irons comprising a flat core, a resistance element thereon, protective sheets of insulating material on opposite sides of the core, and a soft metallic cover for said sheets composed of upper and lower plates overlapped and pressed together at their side edges, said unit having terminal elements connected to said resistance element and projecting out from said unit, said sheets projecting beyond the plates at the point where the terminal elements project out, one of said plates having positioning lugs passing through said sheets, said positioning lugs having their free ends bent over between the other of said plates and the adjacent sheet.

JOHN H. STACKHOUSE.